Oct. 27, 1925.
V. WISE
CULTIVATOR
Filed Aug. 2, 1924
1,558,659
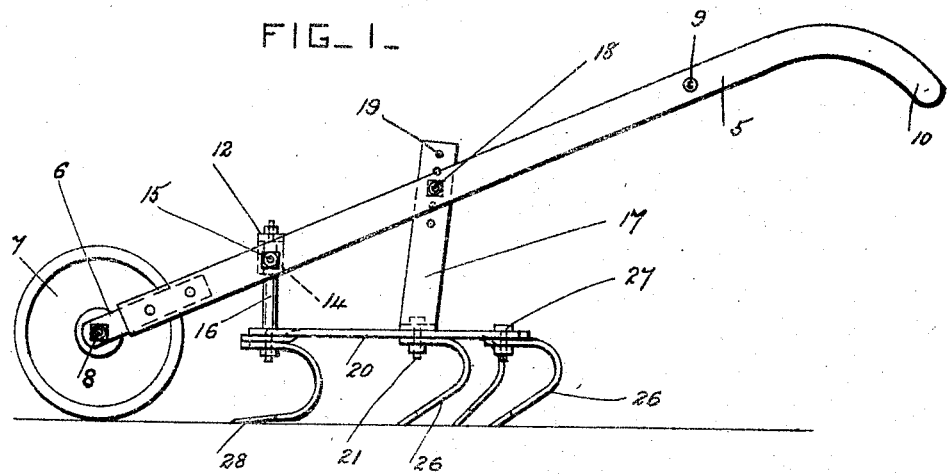
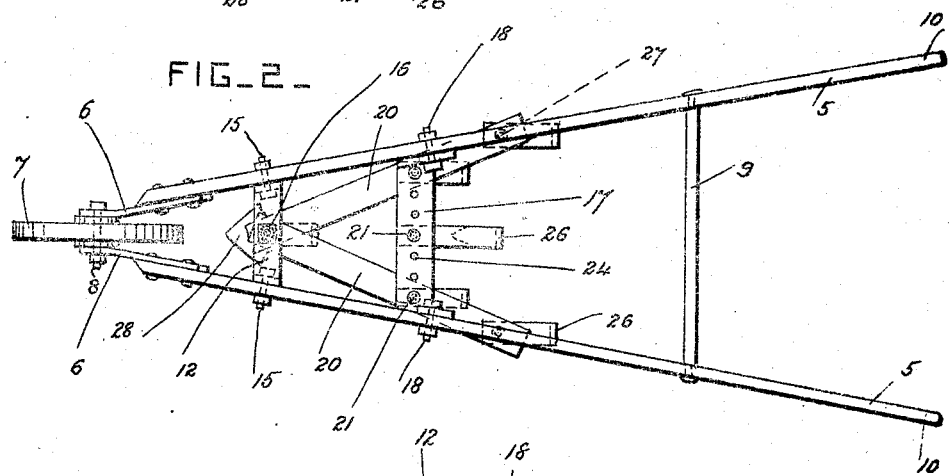
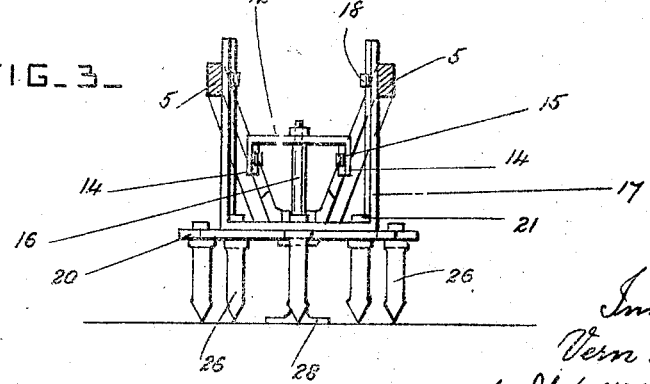

Patented Oct. 27, 1925.

1,558,659

UNITED STATES PATENT OFFICE.

VERN WISE, OF WATERLOO, INDIANA.

CULTIVATOR.

Application filed August 2, 1924. Serial No. 729,757.

*To all whom it may concern:*

Be it known that I, VERN WISE, a citizen of the United States, residing at Waterloo, in the county of De Kalb and State of Indiana, have invented certain new and useful Improvements in Cultivators, of which the following is a specification.

This invention relates to hand cultivators for onions and other similar crops; and it consists in the novel construction and combination of the parts hereinafter fully described and claimed.

In the drawings, Figure 1 is a side view of a hand cultivator constructed according to this invention. Fig. 2 is a plan view of the same. Fig. 3 is a rear end view of the cultivator, showing the handle bars in cross-section.

Two inclined handle bars 5 are provided, and have metal arms 6 secured to their front ends. A ground wheel 7 is journaled on a pin 8 between the arms 6. A distance piece 9 is secured between the rear and upper end portions of the handle bars, and 10 are the usual handles.

A crossbar 12 is provided, and has downwardly projecting flanges 14 at its ends which are pivotally connected with the front end portions of the handle bars by bolts 15. When these bolts are tightened the crossbar is clamped in place. A pivot pin 16 is secured vertically to the middle part of the crossbar 12 and projects downwardly of it. A rectangular bracket 17 is arranged to the rear of the crossbar 12, and is secured to the handle bars by bolts 18 which permit it to be adjusted pivotally, and then clamped in place. The arms of the bracket 17 have each a series of bolt holes 19 for the bolts 18 to engage with, so that the position of the bracket can be adjusted vertically.

Horizontal frame bars 20 have their front ends pivoted to the lower end portion of the pivot pin 16, and are arranged at an angle to each other. These frame bars are clamped to the bottom member of the bracket 17 by bolts 21, and the frame bars 20 may be set at various angles, a plurality of holes or slots 24 being provided in the bracket for the clamping bolts 21 to engage with.

Cultivating teeth or blades 26 are secured to the underside of the frame bars and bracket, and the rear end teeth have bolts 27 for securing them to the frame bars. A blade 28 is secured to the lower end of the pivot pin 16, and is preferably triangular in form, but it and the other blades or teeth may be of any approved form according to the nature of the crop and soil. All the cultivating teeth or tools preferably have curved shanks.

The depth of the cut of the cultivating teeth is regulated by raising or lowering the bracket 17 in relation to the handle bars, the crossbar 12 being moved pivotally at the same time, and it and the bracket 17 are subsequently clamped to the handle bars.

The cultivator is pushed or drawn along in the usual way, with its rear end supported by the operator, and its front end carried by the wheel 7.

What I claim is:

A cultivator, comprising a pair of handle bars provided with a ground wheel, a crossbar pivoted between the handle bars, a pivot pin having its upper end secured to the said crossbar and adjusted circumferentially of the pivot of the crossbar, substantially horizontal frame bars having their front end portions pivoted on the lower part of the said pin, cultivating tools secured to the frame bars, an adjustable bracket comprising a horizontal member and upwardly projecting arms at the ends thereof, means for adjustably securing the said arms to the handle bars to hold the horizontal member at various elevations, and adjustable means for securing the frame bars to the said horizontal member at various angles to each other.

In testimony whereof I have affixed my signature.

VERN WISE.